Feb. 28, 1928.
C. O. MARSHALL
1,660,679
INDICATING MECHANISM FOR WEIGHING SCALES
Filed Nov. 10, 1923      2 Sheets-Sheet 1
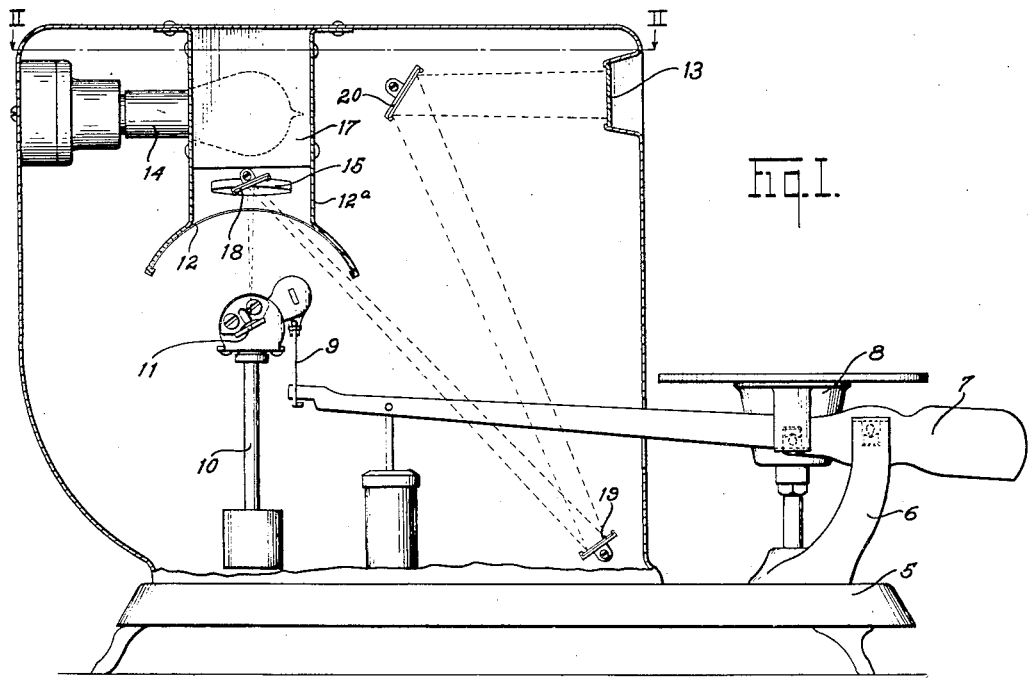
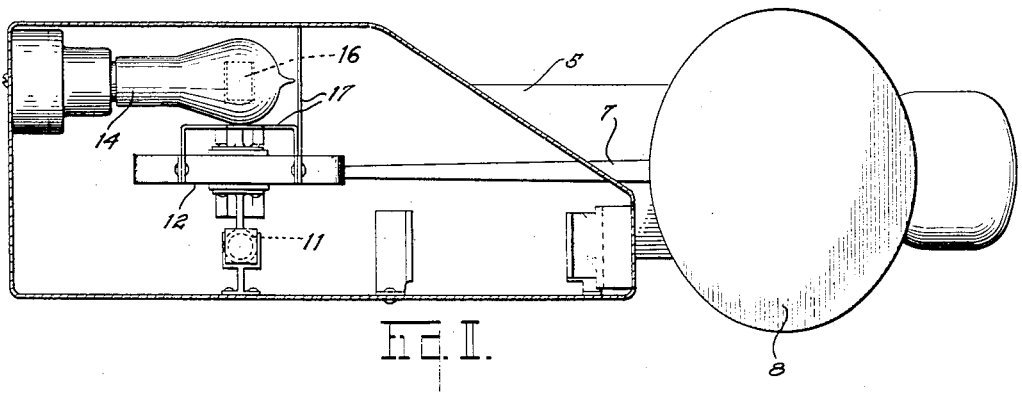
Inventor
Charles O. Marshall Feb. 28, 1928.
C. O. MARSHALL
1,660,679
INDICATING MECHANISM FOR WEIGHING SCALES
Filed Nov. 10, 1923    2 Sheets-Sheet 2
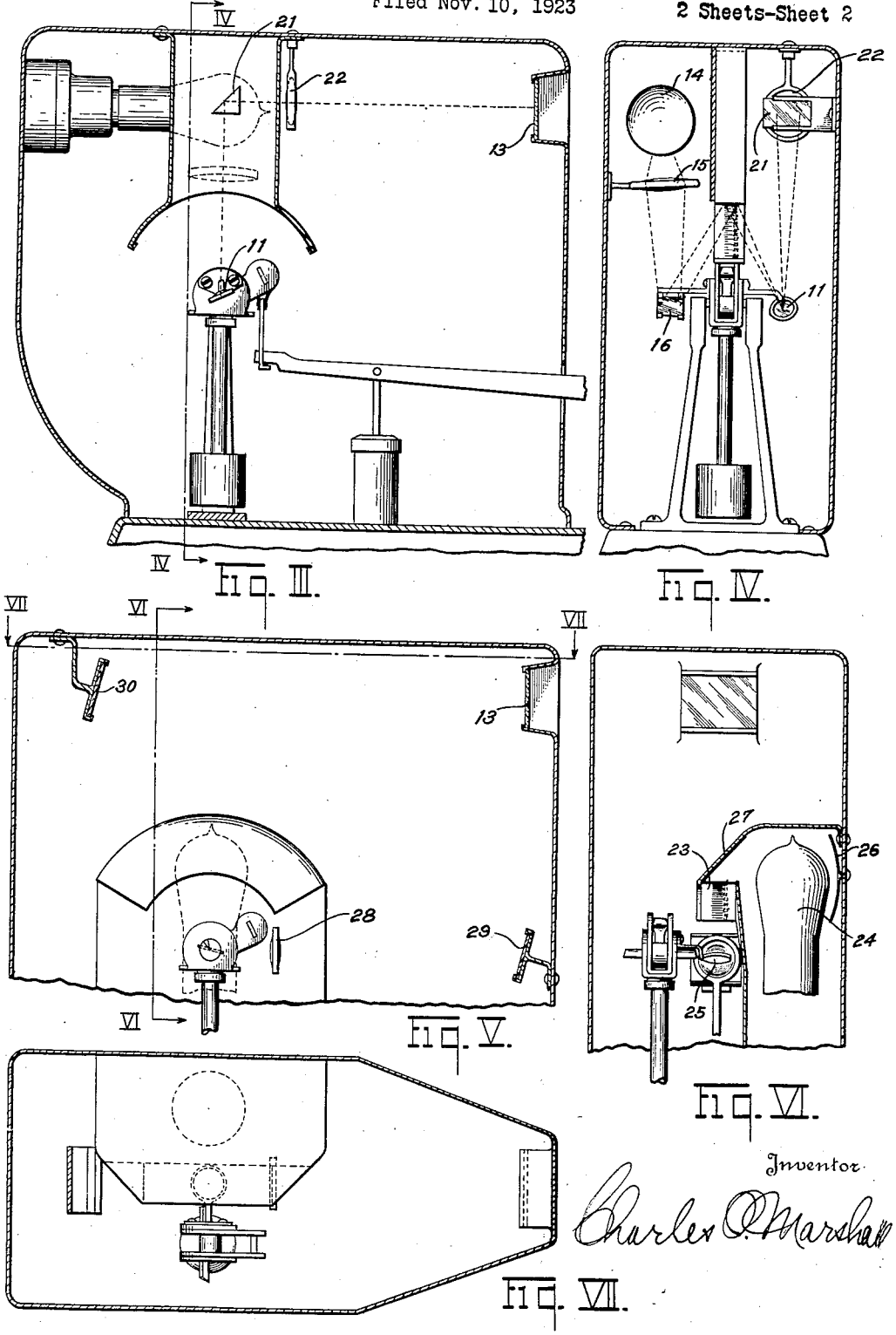
Inventor
Charles O. Marshall Patented Feb. 28, 1928.

1,660,679

UNITED STATES PATENT OFFICE.

CHARLES O. MARSHALL, OF TOLEDO, OHIO, ASSIGNOR TO TOLEDO SCALE COMPANY, OF TOLEDO, OHIO, A CORPORATION OF NEW JERSEY.

INDICATING MECHANISM FOR WEIGHING SCALES.

Application filed November 10, 1923. Serial No. 673,962.

This invention relates to indicating mechanism for weighing scales, and has for its primary object the provision in a scale of a fixed graduated chart and a fixed reading screen upon which the weight of a commodity being weighed is projected by means of a light ray reflected from the chart.

It has heretofore been proposed to project a beam of light through a transparent graduated chart on to a ground glass screen after the manner of motion pictures, or to reflect a light ray from an opaque chart upon a screen, but each construction has the defects that the chart must be movable with the scale mechanism and located comparatively close to the source of light. The magnification engendered is such that a very minute derangement of the chart will render inaccurate the indication at the screen, and it has been found to be practically impossible to mount an intermittently movable chart so as to prevent its derangement. Also the heat from an electric bulb or other source of light tends to warp the chart and distort the image projected upon the screen. By securing both the chart and the screen upon stationary parts of the scale these objectionable features are obviated, and a scale provided that will remain accurate for long periods of time.

A further object of the invention is the arrangement upon a moving portion of the scale of a reflecting lens adapted to receive a ray of light from a concealed chart and transmit it to a screen in full view of the operator, the chart and screen being arranged at the conjugate focal points of the lens.

Other objects and advantages will be apparent from the following description wherein reference is made to the accompanying drawings illustrating preferred embodiments of my invention and wherein similar reference numerals designate similar parts throughout the several views.

In the drawings:

Fig. I is a longitudinal sectional view of a scale constructed in accordance with my invention.

Fig. II is a horizontal section taken substantially on the line 2—2 of Fig. I.

Fig. III is a longitudinal section showing a slightly modified form of indicating mechanism.

Fig. IV is a cross section taken substantially on the line 4—4 of Fig. III.

Fig. V is a detail longitudinal section of another modified form of indicating mechanism.

Fig. VI is a cross section taken substantially on the line 6—6 of Fig. V, and

Fig. VII is a horizontal section taken substantially on the line 7—7 of Fig. V.

Referring now to the drawings, the numeral 5 designates a scale base upon which is mounted standards 6 for the support of the scale beam 7 carrying the commodity receiver 8 and connected, as by the link 9, with the load counterbalancing mechanism, herein shown as a pendulum 10. This scale mechanism is illustrated only as an exemplification of one means for counterbalancing the weight of the commodity placed upon the receiver 8, and it is to be understood that many other forms of load offsetting mechanism can be substituted therefor.

The weight indicating mechanism forming the claimed disclosure herein comprises a reflecting lens 11 adjustably secured upon the pendulum 10 in horizontal alignment with the axis of oscillation of the pendulum, a chart 12 fixed upon a stationary portion of the scale casing, and a translucent reading screen 13, the chart 12 and screen 13 being preferably arranged at the conjugate focal points of the lens 11. In the embodiment illustrated in Figs. I and II, a source of light 14, such as an electric bulb, is mounted within the scale casing out of the path of travel of the pendulum 10 and at a position sufficiently removed from the chart 12 that the heat from the bulb will not warp the chart. A beam of light from the bulb 14 passes through a large condensing lens 15 and impinges upon the mirror 16 projecting from the pendulum 10 on the side opposite that which carries the reflecting lens 11, this mirror being slightly tilted so that the light beam is thence thrown upon the opaque chart 12, whence it is reflected to the lens 11. The chart 12, preferably made of enameled metal or other reflecting material on which the graduations and indicating numerals are printed in contrasting color, is arcuate in form and fixed concentrically with relation to the axis of the pendulum 10 so that a ray of light from the mirror 16 will fall upon some portion of the chart regardless of the angle assumed by the pendulum. As herein shown I have provided a bracket 12ª depending from the top of the scale casing and provided with curved supporting edges for securely holding the chart 12 in position. Walls 17 are also secured upon the bracket 12ª in position to prevent the passage of light rays from the bulb to the chart 12 or screen 13, except through the condensing lens 15 as above described.

The reflecting lens 11 is preferably formed with a convex face and a silvered back so that it acts both as a reflector and as a lens. Accordingly the light ray from the chart 12 is reflected by the lens 11 because of its silvered back and sharply defines the image upon the screen 13 because of its lens formation. As above described one of the foci of the lens 11 is the chart 12 and the conjugate foci thereof is the screen 13, but to enable the placing of the screen 13 in position for convenient reading by the scale operator a series of deflecting mirrors may be suitably arranged between the lens and screen. Thus in Fig. I the path of the light ray from the lens 11 to the screen 13 is shown by dotted lines as impinging against and being deflected from a series of intermediate mirrors 18, 19 and 20 respectively, which mirrors are adjustably fixed upon the scale casing. The size of the image on the screen will be, of course, as many times greater than that on the chart as the distance of the screen from the lens 11 is greater than the distance of the chart 12 from the lens 11.

In practice, the lens 11 and reflecting mirror 16 are adjusted upon the pendulum 10 so that the zero indication upon the chart is reflected upon the screen 13 as long as the pendulum remains in normal position. When, however, a commodity is placed upon the scale pan 8 the pendulum 10 is swung to a position offsetting the weight of the commodity, and at the same time swings the lens 11 and mirror 16 to positions whereby the correct graduations of the chart 12 are shown upon the screen 13 according to the weight of the commodity. As the pendulum swings in reaching the load offsetting position the image upon the screen will move, and when the pendulum finally assumes a position of rest the image on the screen will likewise come to rest, showing the weight of the commodity on the pan 8. This is controlled by the travel of the light ray over the chart 12 as the pendulum is swung, but it is to be noted that with the construction shown the light ray travels through twice the angle through which the pendulum swings, because the angle of incidence will change in proportion to the angle through which the pendulum swings and the angle of reflection will change a like amount.

Since the maximum travel of a weight offsetting pendulum is ordinarily about 60°, a chart extending through an arc of 120° will be sufficient to portray all the weights that can be offset by the pendulum.

In Figs. III and IV I have substituted a reflecting prism 21 and corrective lens 22 for the intermediate series of mirrors 18, 19 and 20 shown in the embodiment illustrated in Figs. I and II. With this construction the ray of light passes from the reflecting lens 11 directly to the prism 21 and thence through the corrective lens 22 onto the screen 13. The simplicity of this arrangement will be apparent, and the addition of the lens 22 will correct for any aberration and insure a clear-cut image upon the screen.

In Figs. V to VII is shown an embodiment wherein a transparent chart 23 is employed between the source of light 24 and the reflecting mirror 25. As herein shown, the bulb 24 is enclosed so that its light rays can escape only through the chart 23, reflectors 26 and 27 being provided to aid in concentrating the light adjacent the chart. The light rays falling upon the reflecting mirror 25 are reflected therefrom through the corrective lens 28 onto the screen 13, deflecting mirrors 29 and 30 being utilized to lengthen the path of the light rays and increase the size of the image at the screen. The reflecting mirror 25 is fixed upon the pendulum in alignment with the pendulum axis, as in the preceding forms, but no other reflecting means are carried by the pendulum or other moving part of the scale.

If desired a reading line may be marked upon the screen 13 or an image of such line projected upon the screen, to aid in quickly determining the correct weight. It will be clear, therefore, that whatever the position of the observer's eye, whether above or below the horizontal plane of the screen or at any angle laterally thereto, the indication of the weight of the commodity on the scale will be correctly perceived.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

Having described my invention, I claim—

1. In a scale, in combination, weighing mechanism, a fixed chart, a fixed reading screen, and a reflecting lens movable with the scale mechanism and adapted to reflect light rays from the chart on to the screen.

2. In a scale, in combination, weighing mechanism, a fixed chart, a fixed reading screen, and a reflecting lens movable with the scale mechanism and adapted to reflect light rays from the chart on to the screen, the chart and screen being arranged at conjugate focal points of the lens.

3. In a scale, the combination of weight offsetting mechanism including a pendulum, a fixed chart, a reading screen, and a reflecting lens movable with the pendulum and means whereby light rays reflected from the chart by the lens are transmitted to the screen.

4. In a scale, the combination of weight offsetting mechanism including a pendulum, a fixed chart, a reading screen, and a reflecting lens movable with the pendulum and means whereby light rays reflected from the chart by the lens are transmitted to the screen, the chart and screen being arranged at conjugate focal points of the lens.

5. In a scale, the combination of weight offsetting mechanism including a pendulum, a fixed chart mounted concentrically to the axis of the pendulum, a reading screen, and a lens secured on the pendulum in horizontal alignment with its axis and means whereby light rays reflected from the chart by the lens are transmitted on to the screen.

6. In a scale, the combination of weight offsetting mechanism including a pendulum, a fixed chart mounted concentrically to the axis of the pendulum, a reading screen, a lens secured on the pendulum in horizontal alignment with its axis, a mirror secured on the pendulum in horizontal alignment with its axis, and a source of light arranged to transmit its luminous rays onto the mirror, substantially as described.

7. In a scale, the combination of weight offsetting mechanism including a pendulum, a fixed chart mounted concentrically to the axis of the pendulum, a reading screen, a lens secured on the pendulum in horizontal alignment with its axis, a mirror secured on the pendulum in horizontal alignment with its axis, a source of light. and a condensing lens for focusing light rays from the source of light onto the mirror.

8. In a scale, the combination of weight offsetting mechanism including a pendulum, a fixed chart mounted concentrically to the axis of the pendulum, a reading screen, a lens secured on the pendulum in horizontal alignment with its axis, a mirror secured on the pendulum in horizontal alignment with its axis, and a source of light, the arrangement being such that light rays from the source of light will be reflected from the mirror on the chart, thence onto the reflecting lens, and thence onto the screen.

9. In a scale, the combination of weight offsetting mechanism including a pendulum, a fixed chart mounted concentrically to the axis of the pendulum, a reading screen, a lens secured on the pendulum in horizontal alignment with its axis, a mirror secured on the pendulum in horizontal alignment with its axis, a source of light arranged so that light rays from the source of light will be reflected from the mirror onto the chart, thence onto the reflecting lens, and thence onto the screen, and a series of mirrors arranged to deflect the path of the rays between the lens and screen.

10. In a scale, in combination, a fixed chart, a source of light, weighing mechanism including a pendulum, a reading screen, a mirror secured on the pendulum for reflecting the rays of light onto that portion of the chart corresponding to the load upon the scale platform, and means carried by the pendulum, including a reflecting lens, whereby the image reflected from the chart is projected upon the reading screen.

11. In a scale, in combination, a fixed chart, a source of light, weighing mechanism including a pendulum, a reading screen, a mirror secured on the pendulum for reflecting the rays of light onto that portion of the chart corresponding to the load upon the scale platform, means carried by the pendulum, including a reflecting lens, whereby the image reflected from the chart is projected upon the reading screen, and means positioned between the reflecting lens and the screen to deflect the path of the projected rays.

12. In a scale, in combination, a fixed chart bearing weight graduations, a reading screen, a source of light, means for condensing the rays of light, weighing mechanism including a pendulum, a mirror fixed to said pendulum whereby the rays of light may be focused upon that portion of the chart corresponding to the load upon the scale platform, and a reflecting lens carried by the pendulum for projecting the image reflected from the chart upon the reading screen.

13. In a scale, in combination, a fixed chart bearing weight graduations, a reading screen, a source of light, means for condensing the rays of light, weighing mechanism including a pendulum, a mirror fixed to said pendulum whereby the rays of light may be focused upon that portion of the chart corresponding to the load upon the scale platform, a reflecting lens carried by the pendulum for projecting the image reflected from the chart upon the reading screen, and a mirror secured to the pendulum for reflecting the image reflected from the chart.

CHARLES O. MARSHALL.